(12) United States Patent
Brodersen

(10) Patent No.: US 10,661,684 B2
(45) Date of Patent: May 26, 2020

(54) SEAT HEIGHT AND TILT ADJUSTMENT MECHANISM

(71) Applicant: Sears Manufacturing Co., Davenport, IA (US)

(72) Inventor: Cole T Brodersen, Davenport, IA (US)

(73) Assignee: Sears Manufacturing Co., Davenport, IA (US)

( * ) Notice: Subject to any disclaimer, the term of this patent is extended or adjusted under 35 U.S.C. 154(b) by 0 days.

(21) Appl. No.: 16/026,151

(22) Filed: Jul. 3, 2018

(65) Prior Publication Data

US 2020/0009996 A1  Jan. 9, 2020

(51) Int. Cl.
| | |
|---|---|
| *B60N 2/12* | (2006.01) |
| *B60N 2/16* | (2006.01) |
| *B60N 2/18* | (2006.01) |
| *B60N 2/10* | (2006.01) |
| *B60N 2/68* | (2006.01) |
| *B60N 2/02* | (2006.01) |
| *B60N 2/08* | (2006.01) |

(52) U.S. Cl.
CPC .............. *B60N 2/1615* (2013.01); *B60N 2/10* (2013.01); *B60N 2/165* (2013.01); *B60N 2/1695* (2013.01); *B60N 2/682* (2013.01); B60N 2/08 (2013.01); B60N 2/12 (2013.01); B60N 2/16 (2013.01); B60N 2/167 (2013.01); B60N 2/168 (2013.01); B60N 2002/0236 (2013.01)

(58) Field of Classification Search
CPC ........ B60N 2/1615; B60N 2/10; B60N 2/165; B60N 2/1695; B60N 2/682; B60N 2/168; B60N 2/167; B60N 2/16; B60N 2/08; B60N 2/12; B60N 2002/0236

See application file for complete search history.

(56) References Cited

U.S. PATENT DOCUMENTS

| | | | | |
|---|---|---|---|---|
| 4,765,582 | A * | 8/1988 | Babbs .................. | B60N 2/0232 248/394 |
| 4,770,386 | A * | 9/1988 | Hessler ................. | B60N 2/163 248/393 |
| 5,207,480 | A * | 5/1993 | Johnson ............... | B60N 2/1803 248/394 |

(Continued)

*Primary Examiner* — Tan Le
(74) *Attorney, Agent, or Firm* — Lane & Waterman LLP

(57) ABSTRACT

An adjustment assembly or mechanism that permits adjustment of the height and angle of tilt of a vehicle seat includes front and rear latch gears with multiple cogs corresponding to discrete angular positions of the latch gears and consequently discrete heights of the front and rear of the adjustment assembly. The front latch gears pivot about a fixed pivot axis while the rear latch gears pivot about a sliding pivot axis to accommodate tilt angles for the seat. Torsion springs bias the four latch gears to a maximum rotation or pivot position in which the respective ends of the seat are at their highest vertical position. A spindle engages the cogs of the latch gears to hold the latch gears in a particular discrete angular position. Separate front and rear manual actuation levers at the front of the seat can be lifted to release a respective front and rear spindle from a particular cog and allow the driver to adjust the seat position. The independent front and rear adjustment mechanisms allow the driver to place the seat in a wide range of heights and tilt angles, including forward and rearward tilt angles.

14 Claims, 17 Drawing Sheets

(56) References Cited

U.S. PATENT DOCUMENTS

| | | | | |
|---|---|---|---|---|
| 5,383,640 A * | 1/1995 | Johnson | ............... | B60N 2/0705 248/372.1 |
| 5,568,908 A * | 10/1996 | Kisiel | ................. | B60N 2/0705 248/419 |
| 6,488,337 B1 * | 12/2002 | De Voss | ................. | B60N 2/181 248/419 |
| 6,502,799 B2 * | 1/2003 | Lepaule | ............... | B60N 2/1615 248/396 |
| 6,691,969 B2 * | 2/2004 | Fretschner | ............... | B60N 2/02 248/371 |

\* cited by examiner

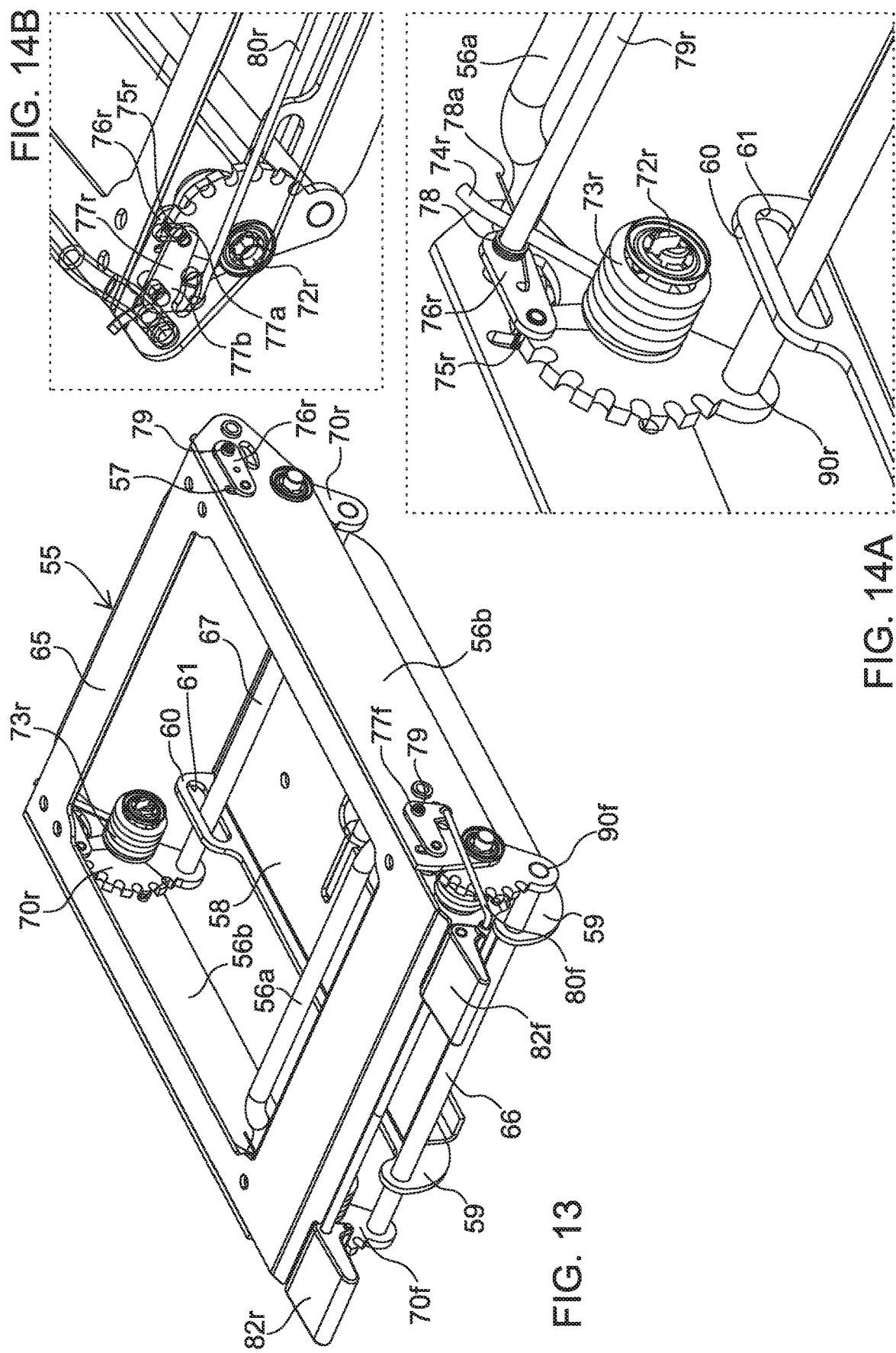

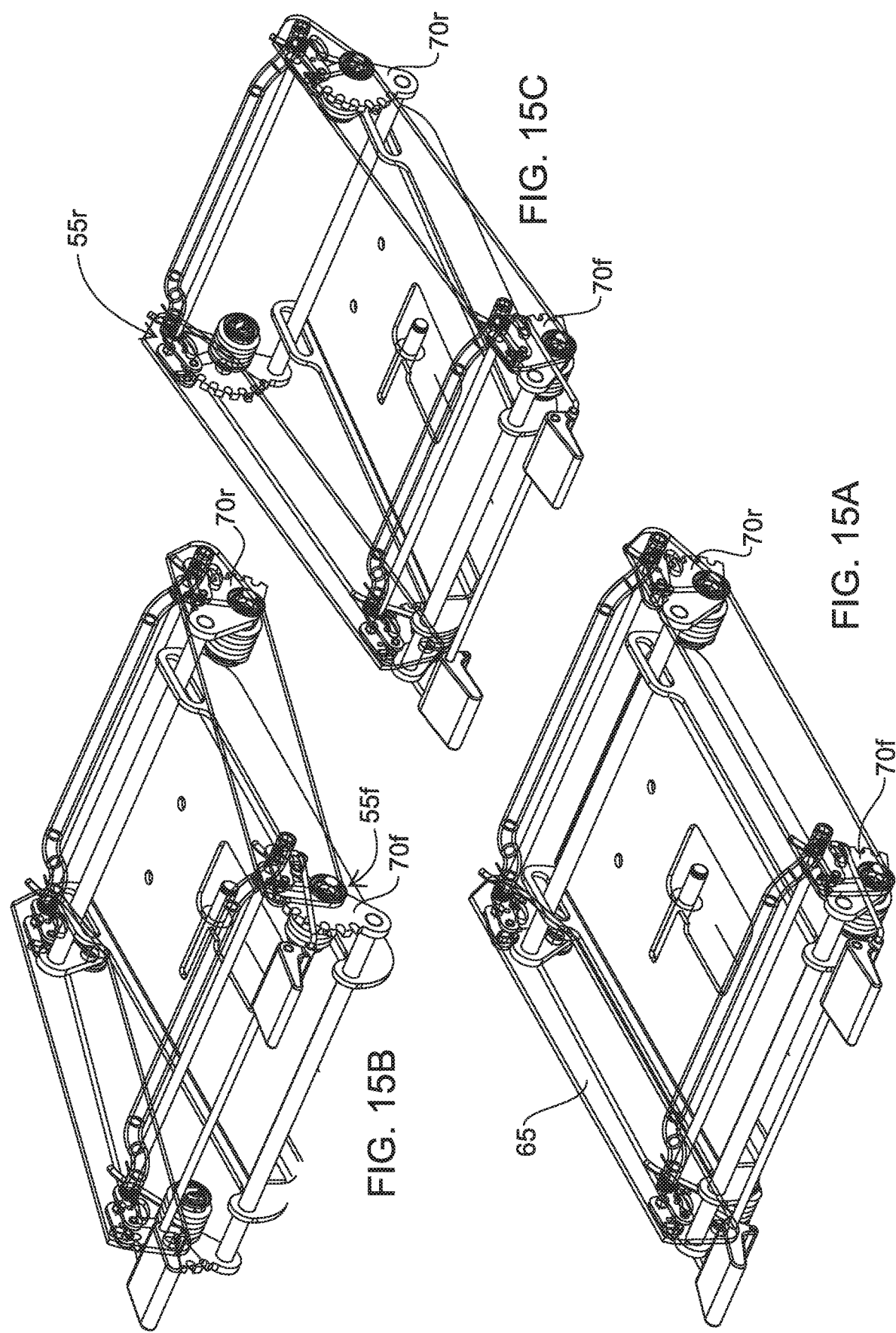

| FRONT | REAR | ANGLE | DIRECTION | VERT | HEIGHT | INCREMENT |
|---|---|---|---|---|---|---|
| UP | UP | 0 | LEVEL | | | |
| UP | -20 | 1.12206 | REARWARD | | | |
| UP | -40 | 2.91239 | REARWARD | | | |
| UP | -60 | 5.1354 | REARWARD | | | |
| UP | -80 | 7.44152 | REARWARD | | | |
| UP | -100 | 9.45748 | REARWARD | | | |
| UP | -120 | 10.8902 | REARWARD | | | |
| -20 | UP | 1.05078 | FORWARD | | | |
| -40 | UP | 2.57789 | FORWARD | | | |
| -60 | UP | 4.46531 | FORWARD | | | |
| -80 | UP | 6.47517 | FORWARD | | | |
| -100 | UP | 8.45033 | FORWARD | | | |
| -120 | UP | 10.2133 | FORWARD | | | |
| UP | UP | 4r | LEVEL | 93.3289 | 61.4065 | 6.2513 |
| -20 | -20 | 0 | LEVEL | 87.0776 | 55.1552 | 9.5776 |
| -40 | -40 | 0 | LEVEL | 77.5 | 45.5776 | 11.7487 |
| -60 | -60 | 0 | LEVEL | 65.7513 | 33.8289 | 12.5026 |
| -80 | -80 | 0 | LEVEL | 53.2487 | 21.3263 | 11.7487 |
| -100 | -100 | 0 | LEVEL | 41.5 | 9.5776 | 9.5776 |
| -120 | -120 | 0 | LEVEL | 31.9224 | 0 | 0 |
| MID | UP | 4.46531 | FORWARD | | | |
| MID | -20 | 3.56495 | FORWARD | | | |
| MID | -40 | 2.01292 | FORWARD | | | |
| MID | -60 | 0 | LEVEL | | | |
| MID | -80 | -2.16972 | REARWARD | | | |
| MID | -100 | -4.14947 | REARWARD | | | |
| MID | -120 | -5.64391 | REARWARD | | | |
| UP | MID | -5.1354 | REARWARD | | | |
| -20 | MID | -3.84049 | REARWARD | | | |
| -40 | MID | -2.06573 | REARWARD | | | |
| -60 | MID | 0 | LEVEL | | | |
| -80 | MID | 2.16972 | FORWARD | | | |
| -100 | MID | 4.25802 | FORWARD | | | |
| -120 | MID | 6.07824 | FORWARD | | | |

FIG. 18A

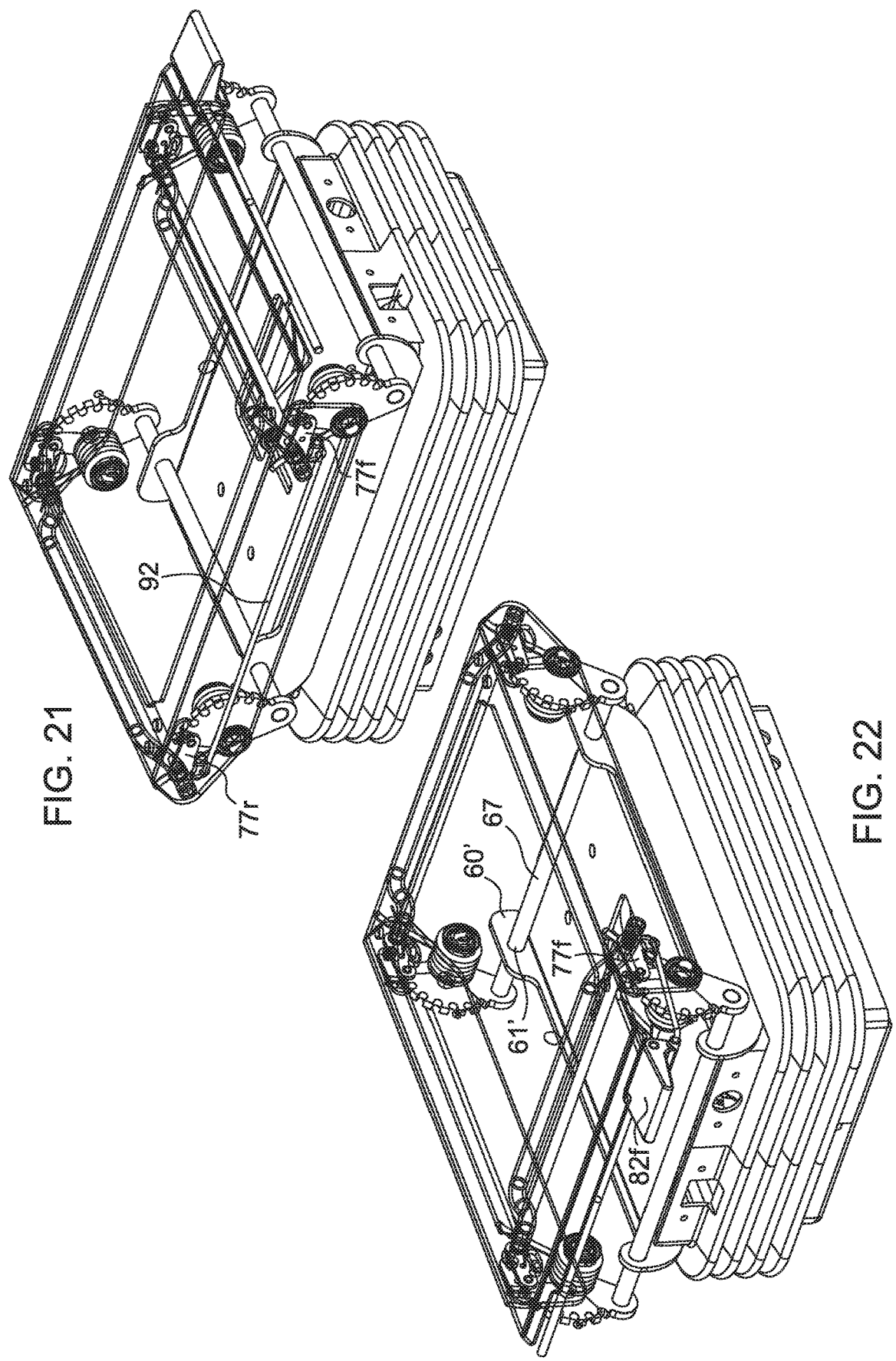

SEAT HEIGHT AND TILT ADJUSTMENT MECHANISM

BACKGROUND

This disclosure concerns adjustable seats, such as seats in industrial, construction, farming and commercial vehicles, and particularly to seats capable of adjustments of height and tilt of the seat.

Seats are a critical component for the comfort of a driver, particularly for drivers of heavy duty vehicles, such as farm tractors, construction vehicles, and the like. Drivers of vehicles of these types are often seated for long periods of time so the driver's comfort level will often change throughout the day. Moreover, the drivers themselves may change from day-to-day or job-to-job, with each driver having his/her own comfort preferences.

One key comfort component for vehicle seats is the seat height and the angle of tilt of the seat relative to the dashboards or controls of the vehicle. Consequently, many seat assemblies include one or more mechanisms for adjusting the height and angle of the seat. In some vehicles, the two adjustments are made by two independent mechanisms. In more sophisticated seats assemblies, the height and angle adjustments are combined into a common mechanism. One such system is depicted in FIGS. 1-8. The seat assembly 10 includes a seat 12 having a conventional seat back 12a and seat bottom 12b, with the seat bottom supported on a base 13 that is mounted to the vehicle. The base may be configured to allow linear front-back movement of the seat assembly, and may even permit rotation of the seat assembly or seat bottom to facilitate access to the seat.

The seat assembly 10 includes an adjustment assembly 15 that includes upper frame members 16 configured to be mounted to the seat bottom 12b in a conventional manner. As best shown in FIGS. 3-5, the adjustment assembly 15 includes front and rear pivot bars 18f, 18r mounted between the upper frame members 16. A corresponding front and rear lever arm 19f, 19r is mounted to the respective pivot bar 18f, 18r so that the lever arm can pivot about a horizontal axis. The lever arms 19f, 19r may be pivotably mounted on the pivot bar 18f, 18r, or the pivot bar may be mounted for rotation relative to the frame with the lever arms fixed to the respective pivot bars.

A pivot post 21f, 21r projects horizontally from the free end of the corresponding lever arm 19f, 19r. A pivot arm 20f, 20r is pivotably mounted to a respective lever arm 19f, 19r by a corresponding pivot post 21f, 21r so that the lever arm can pivot relative to the pivot arm, even as the pivot arm can pivot relative to the frame. A torsion spring 22 is mounted on each pivot post 21f, 21r to apply a torsional spring force to the pivot atm 20f, 20r. Each pivot arm defines a base mount 23f, 23r that is configured to be engaged to the seat base 13 in a conventional manner. It can be appreciated that when the base mounts 23f, 23r are fastened to the seat base, the torsion springs 22 generate a torsional spring force that tends to pivot the respective pivot arms 20f, 20r away from the base. By virtue of the interface between the pivot arms and the frame 16, as discussed below, this pivoting of the pivot arms away from the seat base manifests in an upward movement of the seat bottom 12b mounted to the frame. This upward movement adjusts the height of the seat assembly and a differential upward movement of the front or back adjustment assemblies 15f, 15r produce the seat tilt.

In this prior adjustment assembly 15, a sliding bar 25f, 25r is engaged between the pivot arms 20f, 20r arranged at opposite sides of the frame 16. The sliding bars thus ensure that the front pivot arms 20f at opposite sides of the assembly 15 move in unison, and that the rear pivot arms 20r at opposites of the assembly 15 also move in unison. The sliding bars 25f, 25r are sized to extend horizontally and laterally through slots 26f, 26r defined in the opposite sides of the frame 16. In the specific assembly shown in FIGS. 1-8, latches 28f, 28r are mounted to the ends of the respective sliding bars 25f, 25r and are configured to slidably support the ends of the bars within the corresponding slots 26f, 26r. The latches are configured to permit smooth and uniform sliding of the sliding bars relative to the frame 16.

It can be appreciated that the lever arms 19f, 19r, the pivot arms 20f, 20r, and the sliding bars 25f, 25r engaged within the slots 26f, 26r, form a three-bar linkage so that rotation of the pivot arm 20f, 20r under operation of the torsion spring 22 causes the sliding bars 25f, 25r and pivot bars 18f, 18r to move upward as the sliding bars slide along the slots 26f, 26r, and causes the angle subtended by the lever arm and pivot arm to decrease. The three-bar linkages of the adjustment assemblies 15f, 15r are configured so that the frame 16, and therefore the seat bottom 12b, is parallel to the base 13 when the lever arms are all at their maximum and minimum ranges of motion.

The adjustment assemblies 15f, 15r include a mechanism to limit the movement of the lever arms and thus the height of the front and the rear of the seat. One latch 28f, 28r mounted to the respective sliding bar 25f, 25r is engaged by a corresponding engagement latch 30f, 30r, as shown in the detail views of FIG. 5. Each latch 28f, 28r defines a notch 34, and each engagement latch 30f, 30r defines a plurality of notches 35 that are sized to engage the notch 34 of the latches 28f, 28r. When the notches 34, 35 are engaged to each other the sliding bar 25f, 25r is prevented from sliding along the slot 26f, 26r, thereby fixing the position of the sliding bar and consequently the orientation of the three-bar linkage of the adjustment assembly 15f, 15r. The notches 35 in the engagement latches 30f, 30r are spaced along the length of the slots 26f, 26r to define the range of motion of the sliding bars and thus the range of vertical movement of the frame 16 and seat bottom 12b relative to the base 13. The engagement latches are mounted to a respective rotation rod 31f, 31r that can be rotated by a respective handle 32f, 32r. Rotation of the handle, and thus the rotation rod 31f, 31r, moves the notches 35 of the engagement latch 30f, 30r into and out of engagement with the notch 34 of the latch 28. When the notches are out of engagement the vehicle driver can physically adjust the height of the front and back of the seat, depending upon which lever 32f, 32r is operated. The torsion springs 22 inherently bias the front and back of the seat upward so that the driver can use his/her weight to control how far upward the front and/or back of the seat is moved. Once the seat has been adjusted to the driver's preference the respective handle 32f, 32r can be rotated to engage the notches 34, 35 of the latch 28f, 28r and engagement latch 30f, 30r.

As demonstrated in FIGS. 6-8, the driver can adjust the height and angle of the seat by manipulating the two handles 32f, 32r. The height can be adjusted by moving both adjustment assemblies 15f, 15r in the same manner. The angle can be adjusted for a forward tilt by moving the rear adjustment assembly 15r more than the front assembly 15f, as shown in FIG. 7a, and for a rearward tilt by adjusting the front adjustment assembly 15f, as depicted in FIG. 7b. Adjusting both assemblies 15f, 15r by the same amount can adjust the height of the seat, as shown in FIGS. 7c, 7d. The chart and graph in FIG. 8 illustrate the range of angles and heights based on the position of the front and rear adjustment assemblies.

SUMMARY OF THE DISCLOSURE

The present disclosure contemplates an adjustment assembly or mechanism that permits adjustment of the height and angle of tilt of a vehicle seat. The adjustment assembly includes front and rear latch gears with multiple cogs corresponding to discrete angular positions of the latch gears and consequently discrete heights of the front and rear of the adjustment assembly. The front latch gears pivot about a fixed pivot axis while the rear latch gears pivot about a sliding pivot axis to accommodate tilt angles for the seat. Torsion springs bias the four latch gears to a maximum rotation or pivot position in which the respective ends of the seat are at their highest vertical position. A spindle engages the cogs of the latch gears to hold the latch gears in a particular discrete angular position. A manual lever at the front of the seat can be lifted to release the spindle from a particular cog and allow the driver to adjust the seat position. Separate levers are provided to adjust the front and rear adjustment mechanisms independently, thereby allow the driver to place the seat in a wide range of heights and tilt angles, including forward and rearward tilt angles.

In one aspect of the present disclosure, an assembly for adjustment of the height and angle of tilt of a seat assembly, the seat assembly having a seat base and an upper seat portion, comprises a frame having a portion configured to be connected to one of the seat base and upper seat portion and a base plate configured to be connected to the other of the seat base and the upper seat portion. The frame and base plate each include a front end adjacent a front end of the seat assembly and a rear end adjacent a rear end of the seat assembly. An adjustment assembly is engaged between the frame and the base plate to move the frame and base plate relative to each other. In one aspect, the adjustment assembly includes at two front and rear latch gears rotatably supported on opposite sides of the frame at an axis of rotation adjacent the front end thereof. The latch gears include a plurality of cogs, each cog corresponding to a predetermined distance between the corresponding front and rear ends of the frame and the base plate. Each latch gear is biased by a biasing spring to a maximum rotation position in which the respective ends of the frame and the base plate are at a maximum distance apart.

The adjustment assembly further comprises a spindle associated with each latch gear that is movably supported on the frame and arranged to engage a selected one of the plurality cogs of the corresponding latch gear to hold the latch gear at a predetermined angular position relative to the frame corresponding to a predetermined distance between the ends of the frame and the base plate. The spindles are moved into and out of engagement with the cogs by corresponding front and rear actuation levers that are both supported by the frame at the front end thereof and positioned for manual access at the front of the seat assembly. The adjustment assembly is operable so that: 1) when the front spindle is disengaged from a cog of the front latch gear the front end of the frame can be moved substantially vertically relative to the base plate and when the front spindle is engaged to a cog of the front latch gear the front end of the frame is held in position relative to the base plate; 2) when the rear spindle is disengaged from a cog of the rear latch gear the rear end of the frame can be moved substantially vertically relative to the base plate and when the rear spindle is engaged to a cog of the rear latch gear the rear end of the frame is held in position relative to the base plate. The front and rear spindles are operable independent of each other to permit independent vertical movement of the front and rear ends of the frame relative to the base plate.

DESCRIPTION OF THE DRAWINGS

FIG. 13 is a perspective view of the adjustment assembly according to the present disclosure.

FIGS. 14A, 14B are enlarged perspective views of a portion of the adjustment assembly shown in FIG. 13.

FIGS. 15A-C are perspective views of the adjustment assembly shown in FIG. 13 in various orientations.

FIG. 18A, 18B are a chart and graphs of seat position based on adjustment assembly operation for the adjustment assembly of the present disclosure.

FIG. 21 is a perspective view of a seat base and adjustment assembly according to a further embodiment of the present disclosure.

FIG. 22 is another perspective view of the seat base and adjustment assembly shown in FIG. 21.

DETAILED DESCRIPTION

Figure 1:
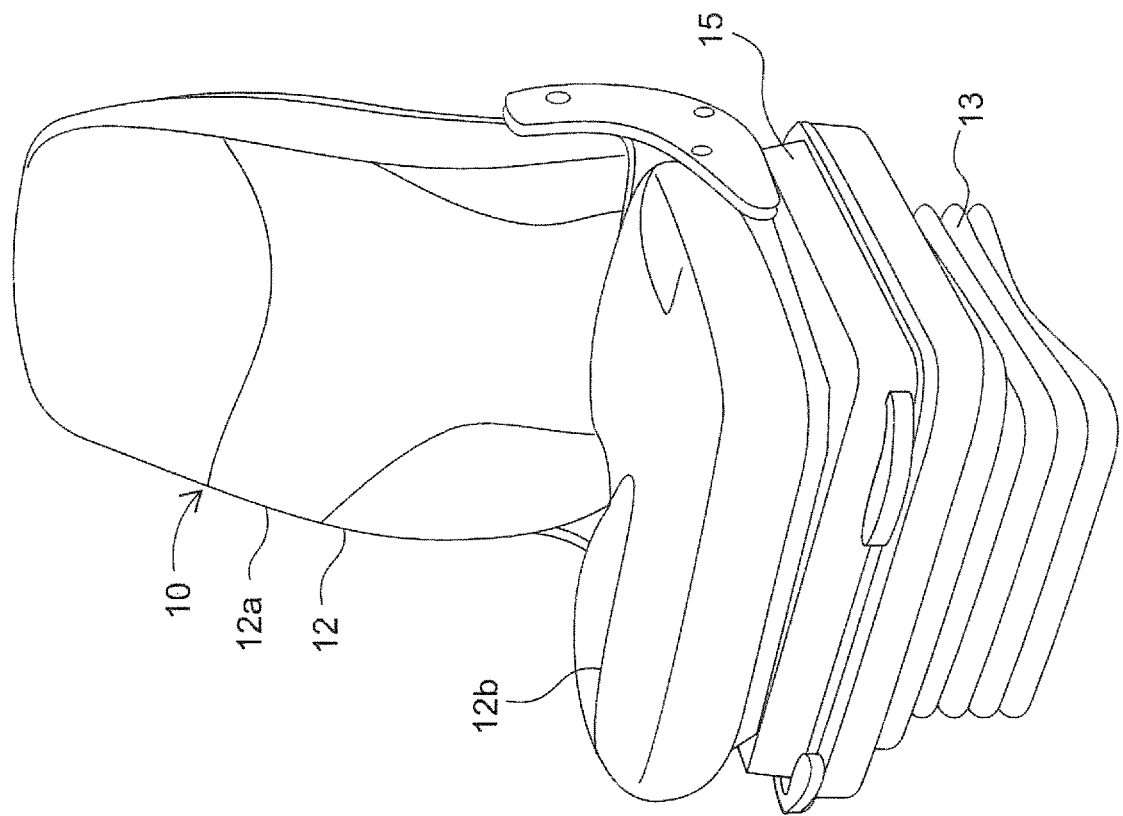
FIG. 1 is a perspective view of an adjustable chair of the prior art.
Figure 2:
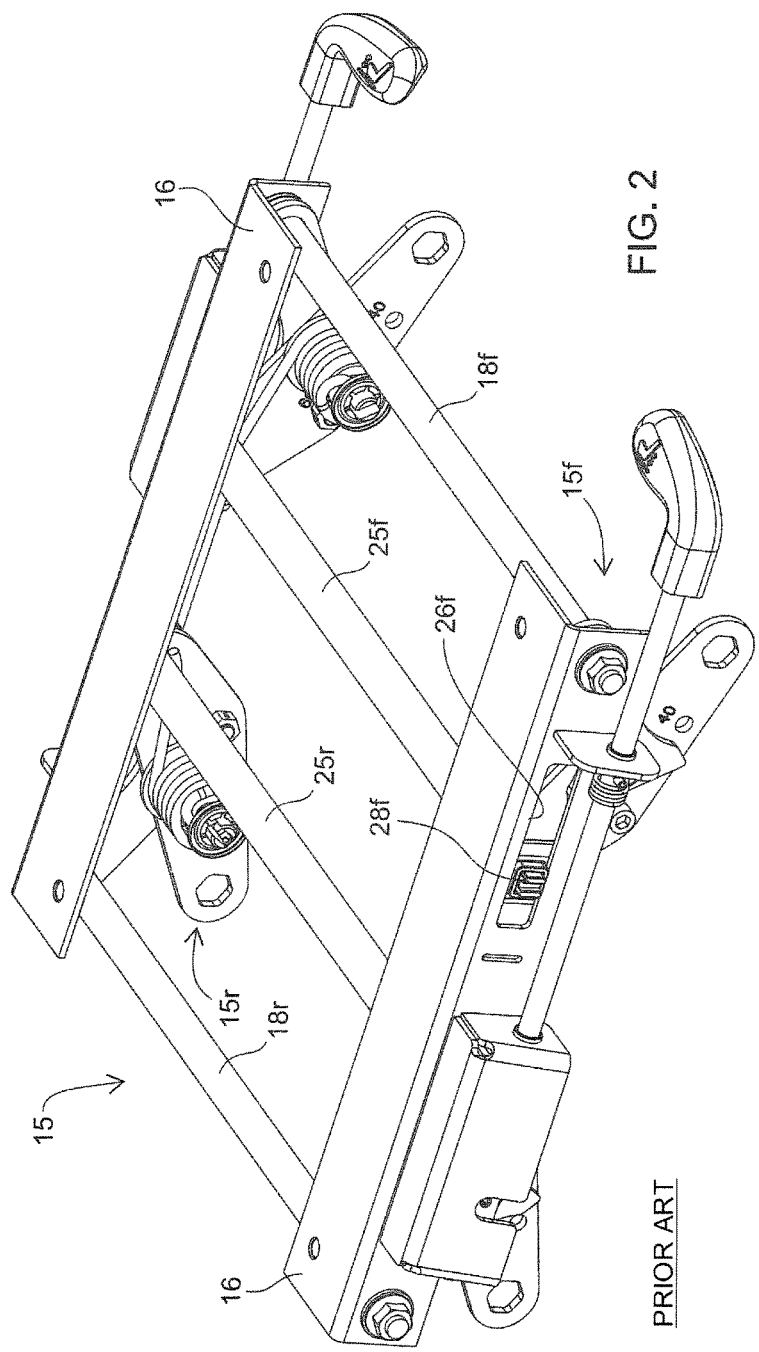
FIG. 2 is a top perspective view of the adjustment assembly shown in FIG. 2.
Figure 3:
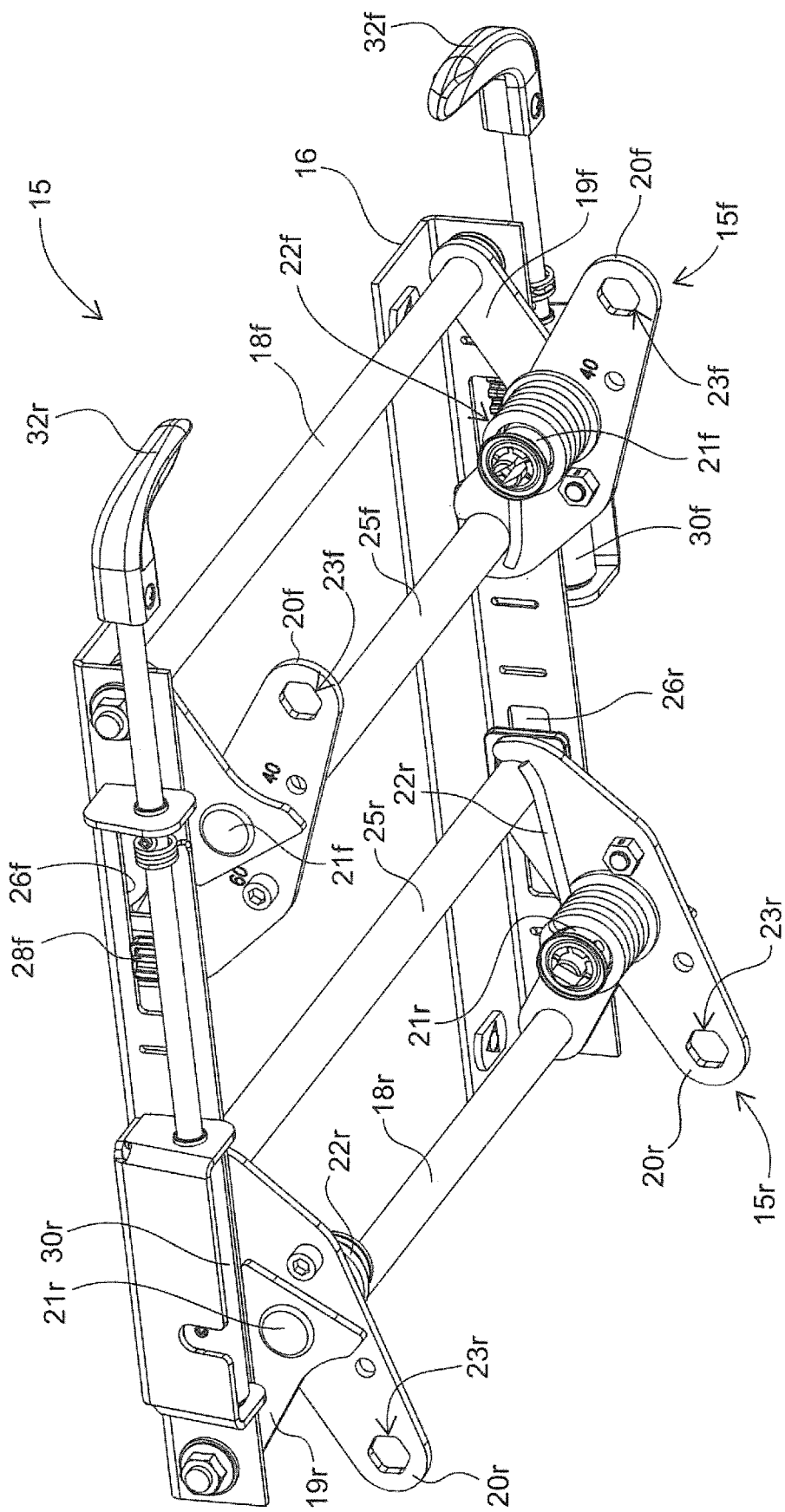
FIG. 3 is a bottom perspective view of the adjustment assembly shown in FIG. 2
Figure 4:
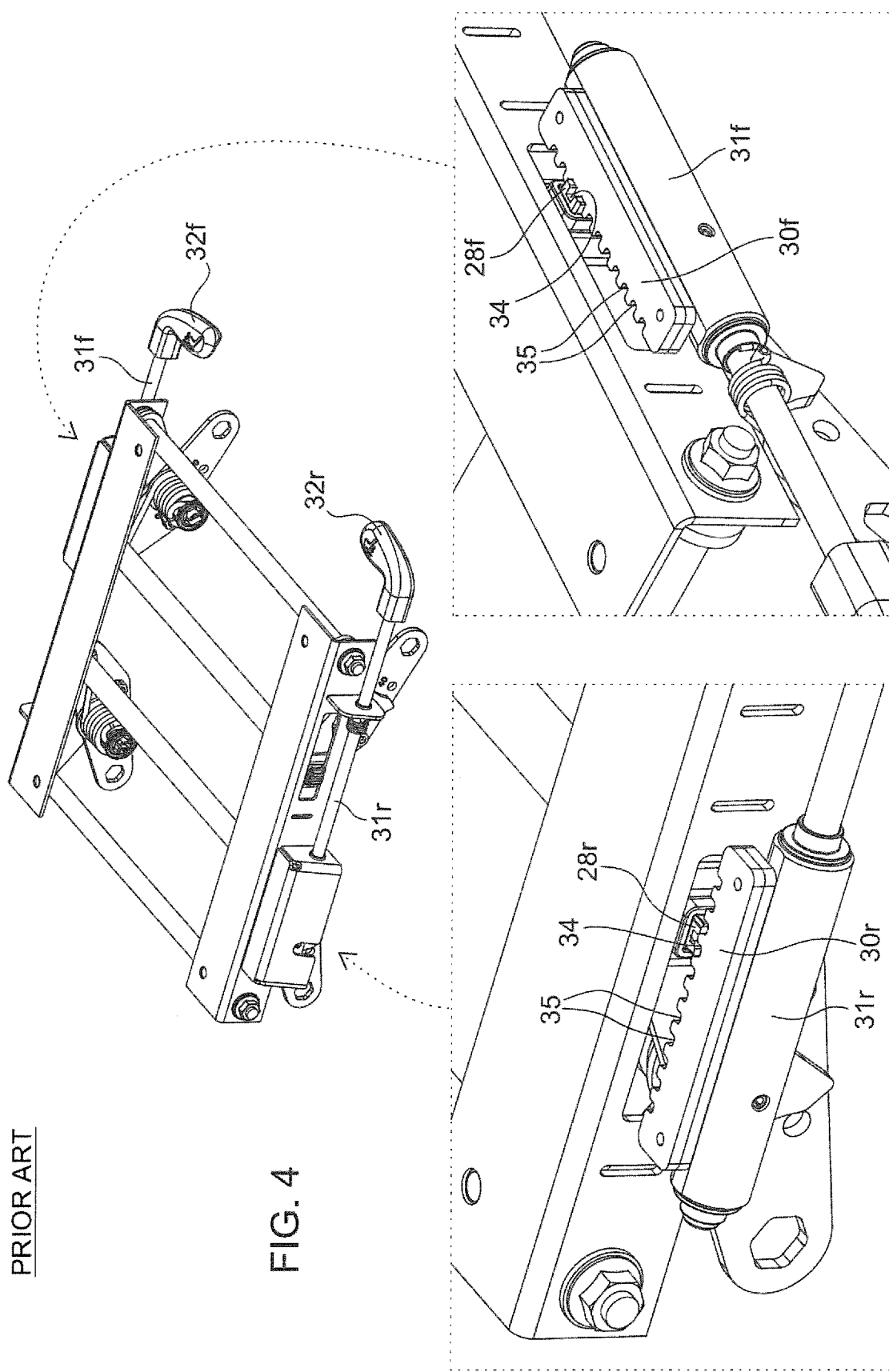
FIG. 4 are perspective and enlarged views of the adjustment assembly shown in FIG. 2
Figure 5:
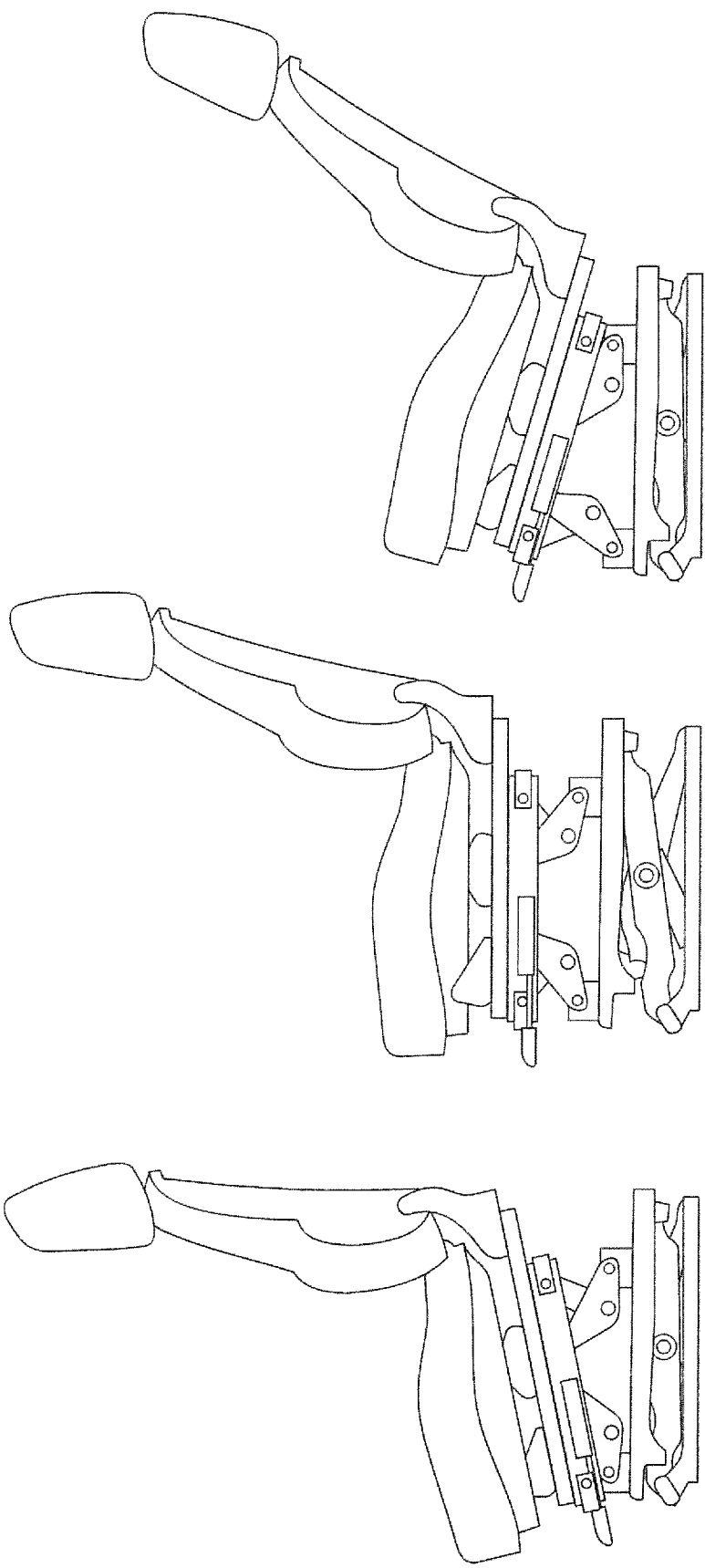
FIG. 5 includes side views of the seat shown in FIG. 1 with different height and angle adjustments.
Figure 6A:
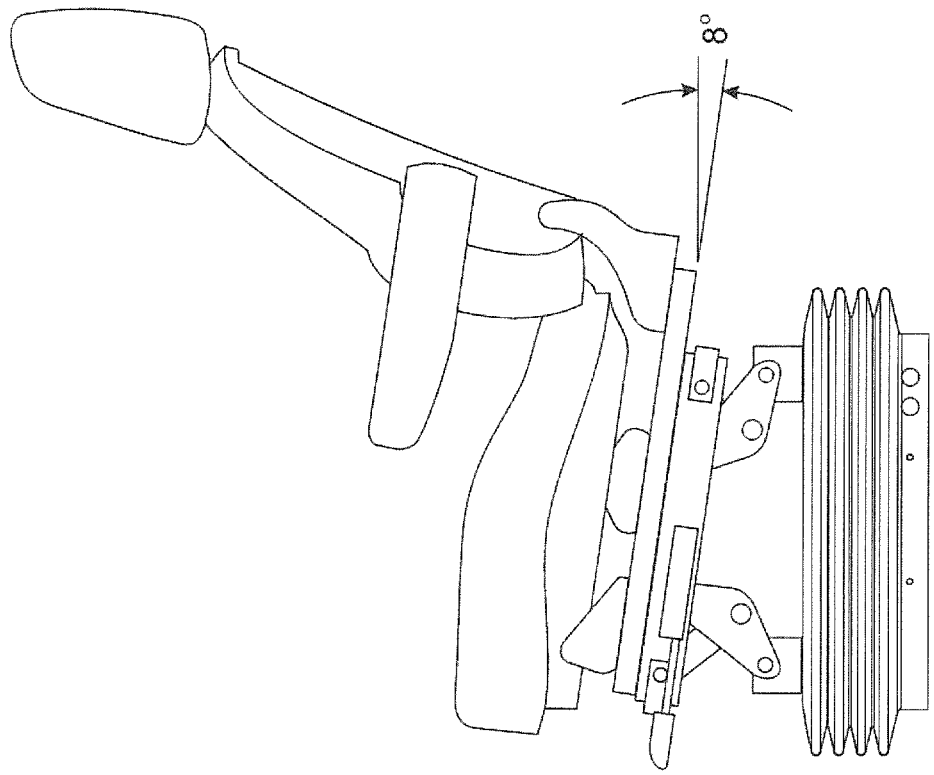
FIGS. 6A, 6B are additional side views of the seat shown in FIG. 1 with different angle adjustments.
Figure 6B:
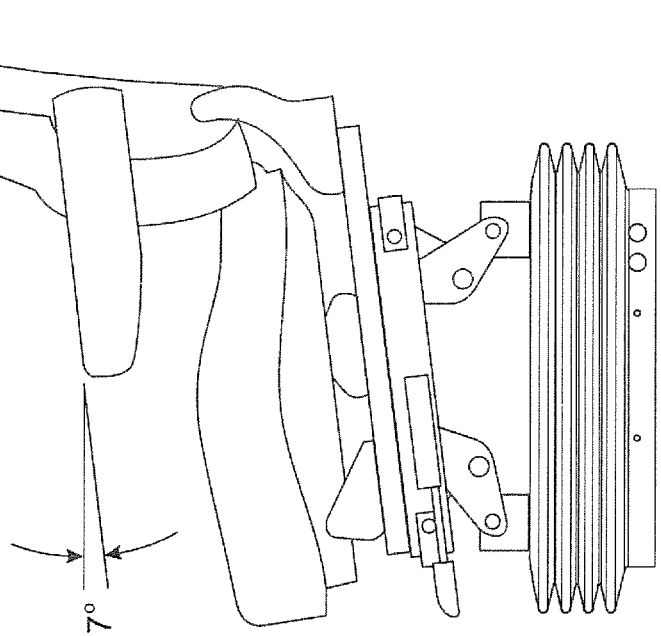
Figure 7:
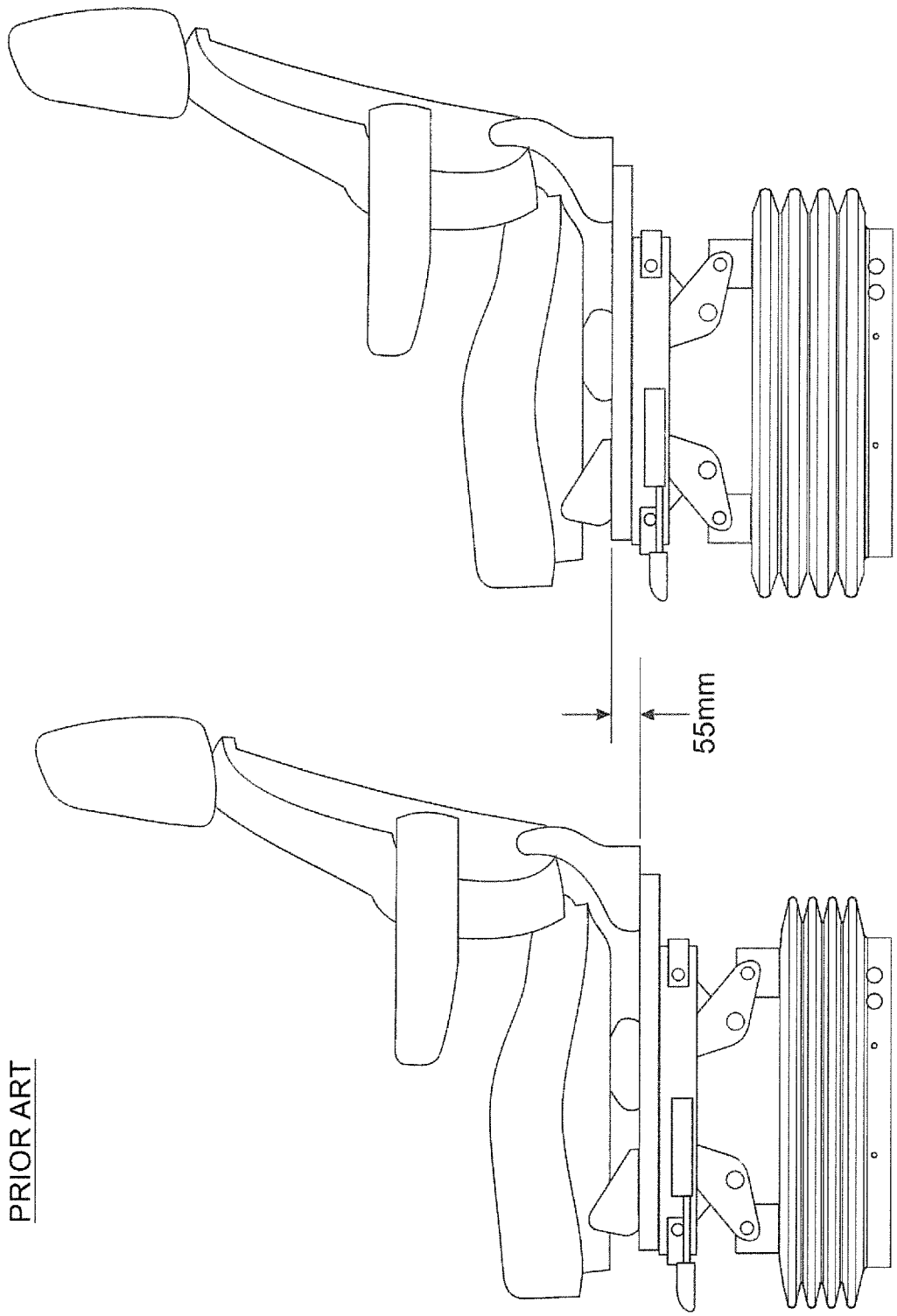
FIG. 7 is a side view of two seats as shown in FIG. 1 showing different height adjustments.
Figure 8:
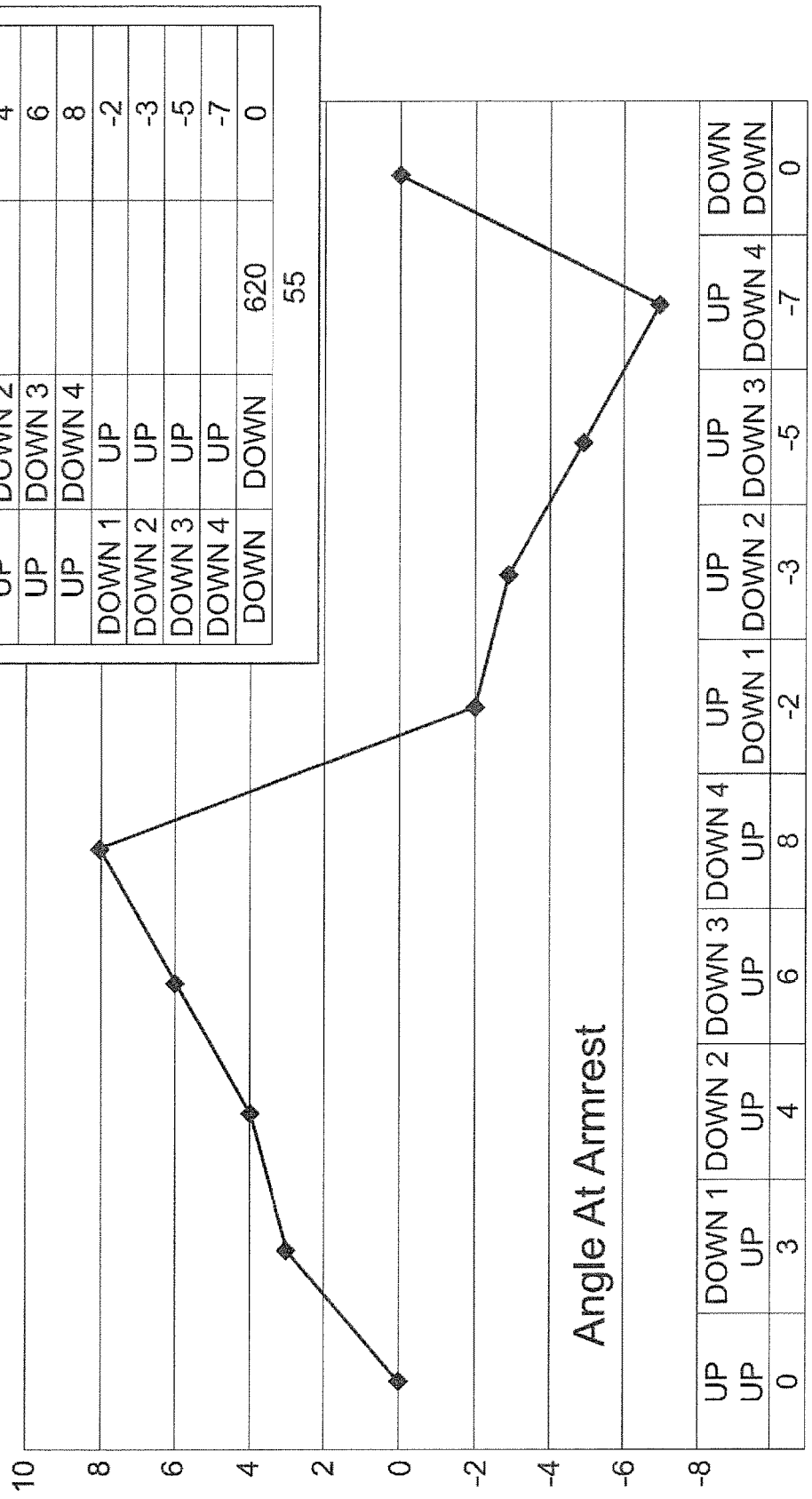
FIG. 8 is a chart and graph of seat position based on adjustment assembly operation.
Figure 10:
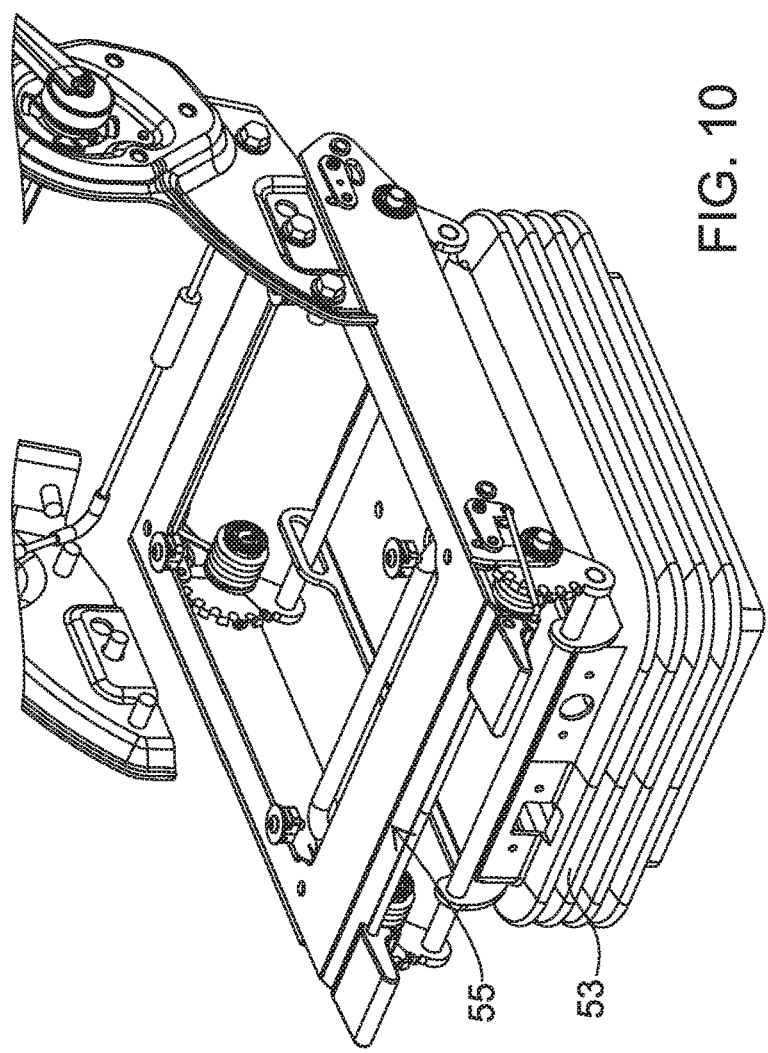
FIG. 10 is a phantom perspective view of the adjustment assembly of the seat assembly shown in FIG. 9.
Figure 9:
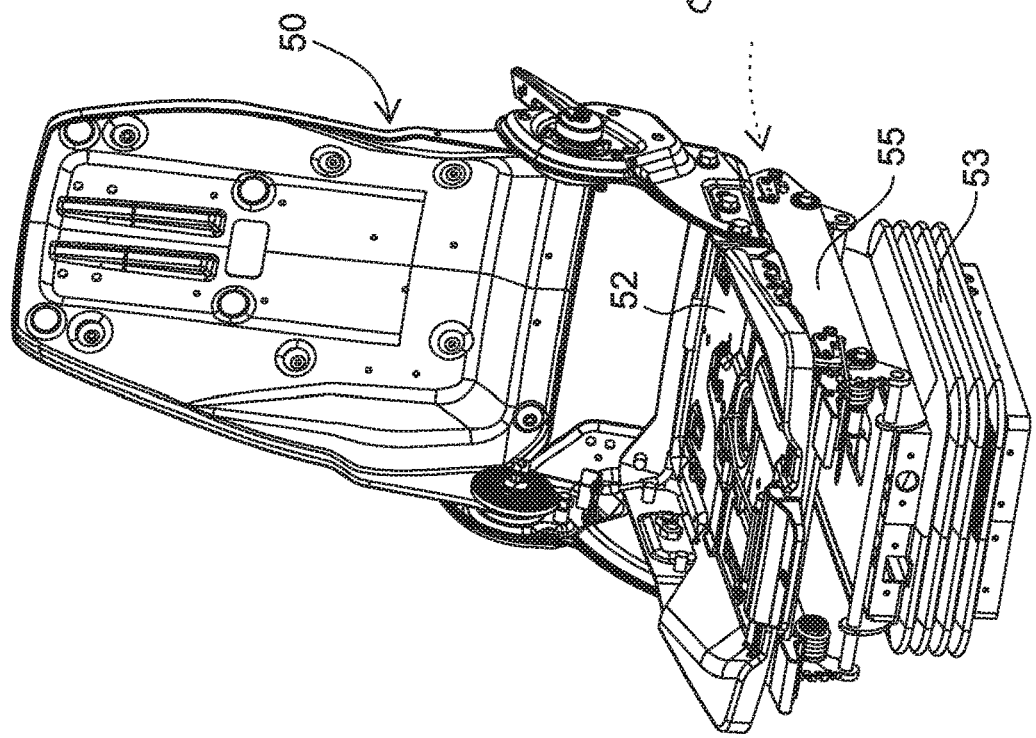
FIG. 9 is a perspective view of a seat assembly according to one embodiment of the present disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains A seat assembly 50 incorporating a set height and tilt adjustment assembly 55 according to one embodiment of the present disclosure is shown in FIGS. 9-18. The seat assembly 50 has an upper portion that can include a seat pan 52 used to support a seat bottom, such as the seat bottom 12*b* in FIG. 1, and a base 53 used to support the entire seat assembly, with the adjustment assembly 55 interposed between the base and the seat pan. As shown in more detail in FIGS. 11-14B, the adjustment assembly 55 includes a frame 56 formed by a pair of frame rods 56*a* spanning between and engaged to opposite side plates 56*b*. An upper plate 65 is fastened to the side plates 56*b* and is configured for engagement to the upper portion of the seat assembly, such as the seat pan 52, to support the seat on the adjustment assembly 55. The assembly includes a base plate 58 that is configured to be engaged to the seat base 53.

The base plate 58 defines a pair of pivot mounts 59 on opposite sides at a front end of the base plate (corresponding to the front end of the seat assembly 50). An upwardly projecting tab 60 is defined at opposite sides of the base plate at the rear of the plate. The tabs 60 define an elongated slot 61 that extends generally horizontally form the back of the base plate 58 toward the front of the plate. A front pivot bar 66 is rotatably disposed within the pair of pivot mounts 59 so that the bar can rotate or pivot relative to the base plate 58. A rear pivot bar 67 extends through the slot 61 in each of the rear tabs 60. The rear bar is configured to pivot and slide within the slot relative to the base plate 58.

The adjustment assembly 55 further includes a pair of front latch gears 70*f* and a pair of rear latch gears 70*r*. (It is noted that the suffix "f" is used to denote a component at the front end of the adjustment assembly and the suffix "r" for a component at the rearward end). The front latch gears 70*f* include an arm 90*f* mounted on the opposite ends of the front pivot bar 66 so that the pivot bar and latch gears rotate together. Alternatively, the latch gears can be pivotably mounted on a stationary front pivot bar. The rear latch gears 70*r* similarly include an arm 90*r* that is mounted on the opposite ends of the rear pivot bar 66. The pair of front latch gears 70*f* can be connected to the front pivot bar 66 so that the two front latch gears move in unison. Similarly, the pair of rear latch gears 70*r* are connected to the rear pivot bar 67 so that the rear latch gears move in unison. As indicated above, the rear pivot bar 67 is constrained within a slot 61 so that the pivot bar can translate and rotate as needed. This constraint of the rear pivot bar also constrains the two rear latch gears to prevent them from moving upward under the force of the torsion spring.

Figure 11:
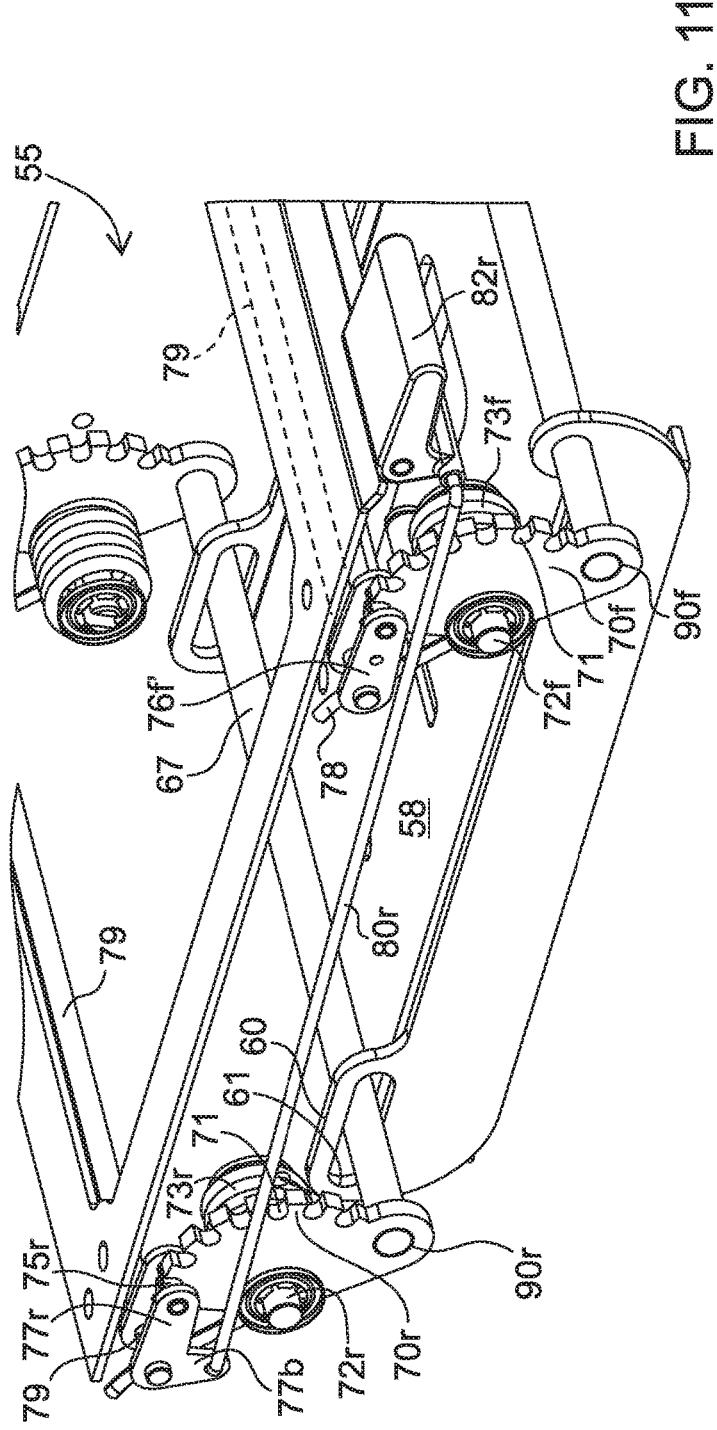
FIG. 11 is an enlarged view of a portion of the adjustment assembly shown in FIG. 10.

The latch gears include a post 72*f*, 72*r* projecting inward from the latch gear, as best seen in FIGS. 14A, 14B. The post supports a torsion spring 73*f*, 73*r* with a leg 74*f*, 74*r* arranged to bear against a respective frame rod 56*a*. The torsion spring is thus anchored against the frame rod and to the latch gear (not shown) to impart a torsional force to the latch gear by way of the post 72*f*, 72*r*. The posts 72*f*, 72*r* are rotatably supported on the frame, as best seen in FIGS. 11, 14A, 14B. The posts thus define an axis of rotation or pivoting for the respective latch gear 70*f*, 70*r*. The arms 90*f*, 90*r* of the respective gears extend a predetermined radial distance from the axis of rotation and it is this distance that determines the maximum distance of the frame relative to the base plate when the latch gears are at their greatest angle of rotation.

The latch gears include teeth or cogs 71 that are used to hold the respective latch gear at a pre-determined degree of rotation corresponding to a predetermined distance between the frame 56 and base plate 58, as discussed below. In the present embodiment, the cogs 71 are arranged on a partial circle centered about the axis of the post 72. The number of cogs determines the number of discrete angular orientations of the latch gears, and thus a discrete number of positions of the front and rear positions of the adjustment assembly relative to the seat base 53. In the illustrated embodiment, seven cogs are spaced apart around the latch gear at 20° intervals to subtend an angle of 120°. The front and rear latch gears can include the same number of cogs or can have different numbers of cogs to achieve different degrees of adjustment of the front and rear of the seat assembly.

The torsion springs 73*f*, 73*r* are arranged to bias the latch gears 70*f*, 70*r* to the position in which the respective end of the adjustment assembly is at its maximum displacement, or such that the frame is at its maximum displacement relative to the base plate 58, such as the positions shown in FIGS. 15B (front) and FIG. 15C (rear). In this position the latch gear is at its maximum front rotation for the rear latch gear 70*r*, and the maximum rearward rotation for the front latch gear 70*f*. In this maximum angle of rotation, the respective arms 90*f*, 90*r* extend downward below the pivot axis through the pivot posts 72*f*, 72*r* so that the radial extents of the arms define the vertical distance between components. The torsion spring also applies an upward force to the frame rod 56*a* through the legs 74*f*, 74*r*. This spring force is resisted by the weight vehicle driver seated in the seat assembly 50 so that the driver can selected a particular height of the front and rear ends of the seat.

Each latch gear 70*f*, 70*r* is engaged by a corresponding spindle 75*f*, 75*r*. The spindle is mounted between a link 76*f*, 76*r* and a lever element in the form of an L-plate 77*f*, 77*r*, both of which are supported on a pivot bar 79*f*, 79*r* that extends across and is supported by the frame plates 56*b*. It is understood that the links and lever elements (or L-plates) on opposite sides of the adjustment assembly are connected to the same pivot bar so that the links and plates on opposite sides rotate in unison. The link 76*f*, 76*r* is disposed inside the frame plate, while the L-plate 77*f*, 77*r* is situated on the outside of the frame plate. The spindle 75*f*, 75*r* extends through an arcuate slot 57 defined in the frame plates so that the slot can move as the link and L-plate are pivoted. A torsion spring 78 is mounted on the pivot bar 79*f*, 79*r* to apply a torsional force to the link 76*f*, 76*r* to bias the spindle toward the latch gear 70*f*, 70*r*. The torsion springs include a leg 78*a* that is arranged to bear against the respective frame rods 56. The spindles 75*f*, 75*r* are thus biased into engagement with the cogs 71 of the respective front and rear latch plates 70*f*, 70*r*.

It can be appreciated that providing a pair of latch gears 70*f*, 70*r* at both the front and the back of the adjustment assembly, along with corresponding spindles 75 provides four latching points for the seat assembly. This is in contrast to prior art systems in which only two latching points are provided—one front and one rear. The adjustment and actuation mechanisms of the assembly 55 operate in unison on opposite sides of the frame 56. This prevents the latching from becoming "lopsided" in which the spindles on opposite sides of the frame engage different cogs of the latch gear.

Figure 12:
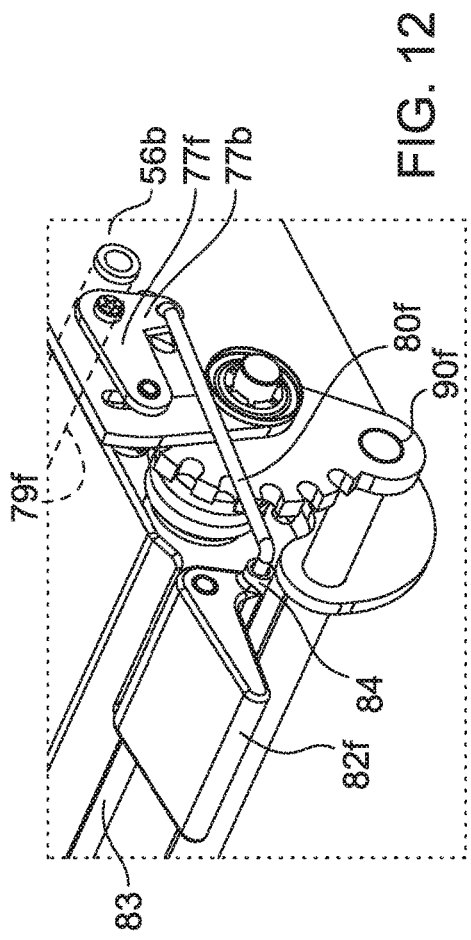
FIG. 12 is an enlarged view of a further portion of the adjustment assembly shown in FIG. 10.

One of the L-plates 77*f*, 77*r* includes an upper arm 77*a* and a lower arm 77*b*. The upper arm extends 77*a* between the pivot bar 77*f*, 77*r* and the spindle 77, while the lower arm 77*b* extends generally perpendicularly below the upper arm. One end of an actuation rod 80*f*, 80*r* is engaged to each lower arm 77*b*, as best seen in FIGS. 12 and 14A-B. The opposite or front end of the actuation rods are engaged to a corresponding front and rear actuation lever 82f, 82r. It can be appreciated that the front actuation rod 80f is shorter than the rear actuation rod 80r. Each actuation lever 82f, 82r is mounted to opposite ends of a common pivot rod 83 that is fixed to the upper plate 65, as shown in FIG. 13. The levers are thus configured to rotate or pivot on the pivot rod 83. A tab 84 on each lever is engaged to the corresponding actuation rod 80f, 80r below the pivot axis of the pivot rod 83 so that lifting the lever pulls the actuation rod, which in turn pulls the lower arm 77b of each L-plate 77f, 77r. Pulling the lower arm pivots the L-plate, and thus the spindle 75f, 75r upward and away from the latch gear 70f, 70r, thereby disengaging the spindle from any cog 71 of the latch gear. When the vehicle driver releases the actuation lever 82f, 82r, the spring force from the torsion spring 78 forces the link 76f, 76r and spindle 75f, 75r down toward and into engagement with a cog of the latch gear.

It can be appreciated that the only one L-plate is required for each of the front and rear actuation mechanisms since only one actuation lever 80f, 80r is provided. Thus, as shown in FIG. 11, the outermost plate 77f' is in the form of a single link, rather than in the form of the L-shaped plate 77f (FIG. 13) on the opposite actuation side of the assembly. A single link 77r' is similarly provided on the rear actuation mechanism. However, it is contemplated that the actuation mechanism can be modified so that the outboard plates 77f' and 77r' can be L-plates with an actuation rod connected to the manually activated levers 82r. A similar modification could be made to the front actuation mechanism.

The vehicle driver can achieves a wide range of orientations of the vehicle seat by selective manipulation of the actuation levers 82f, 82r. As shown in FIG. 15aA, when both latch gears 70f, 70r are at their lowest position the upper plate 65, and therefore the seat pan 52 are at their lowest height. It can be appreciated that in this position the base plate 58 is generally nested within the frame 56 since the arms 90f, 90r of the latch gears are oriented upward. The spindles 75f, 75r are engaged to the cog 71 that is nearest the arm 90f, 90r. In order to achieve this nesting feature, the base plate 58 is sized to fit within front and rear frame rods 56a and the side plates 56b of the frame, and more particularly inside the pivot posts 72f, 72r, as seen in FIGS. 11-12.

The seat can be tilted backward by raising the front mechanisms with the front latch gears 70f at their maximum rotations, as shown in FIG. 15B. Similarly, the seat can be tilted forward by raising the rear mechanisms with the rear latch gears 70r at their maximum rotation, as shown in FIG. 15C. It can be appreciated that in these maximum tilt positions the respective latch gears 70f, 70r are at their maximum upward angle and the spindles 75f, 75r are engaged to the cog 71 that is farthest from the arm 90f, 90r of the latch gear.

Figure 17:
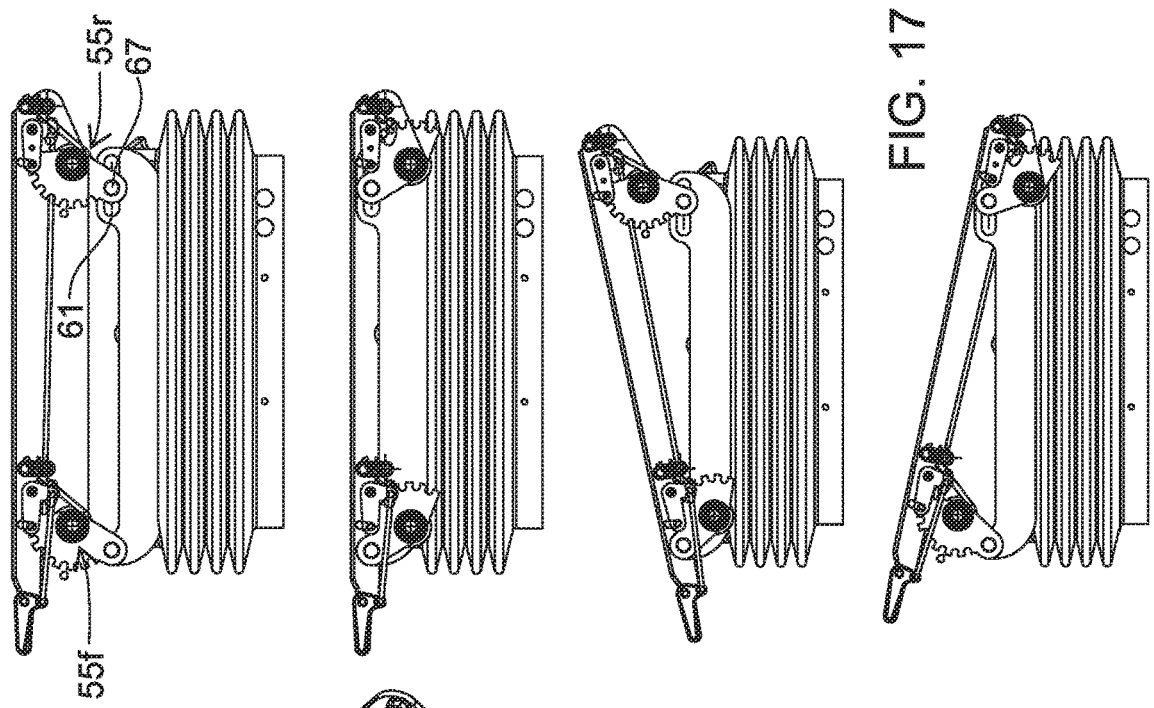
FIG. 17 are side views of the seat base and adjustment assembly in various orientations.
Figure 16:
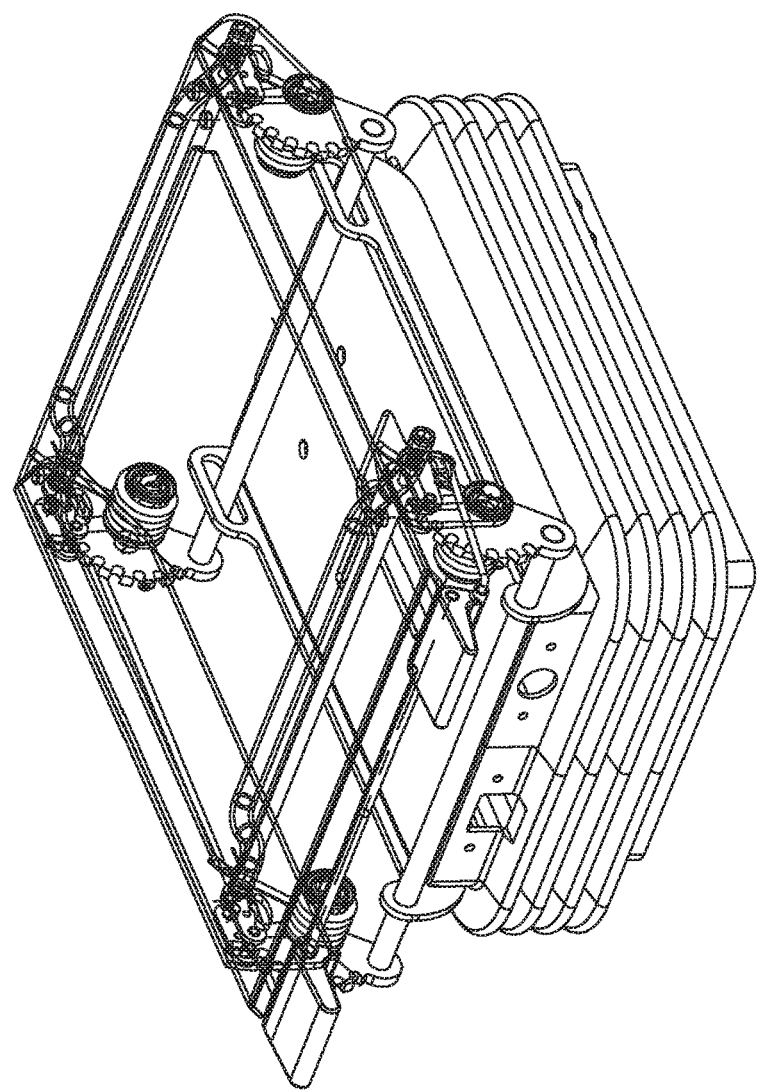
FIG. 16 is a perspective view of the adjustment assembly of FIG. 13 configured for height adjustment of the seat.

As shown in FIG. 17, the seat can be positioned at its maximum height by moving both front and rear latch mechanisms to their maximum rotation. It can be appreciated from FIG. 17 that the rear latch gears 70r, and particularly the rear pivot rod 67 connected between the latch gears, is at different locations within the slot based on the amount of rotation of the latch gear, as well as on the orientation of the front latch gear. When the front and rear latch gears are at their maximum and minimum height orientations, the rear pivot bar 67 is at roughly the same position within the slot. However, when only the front latch gear or only the rear latch gear is at its maximum position, the rear pivot rod shifts rearward.

Figure 18B:
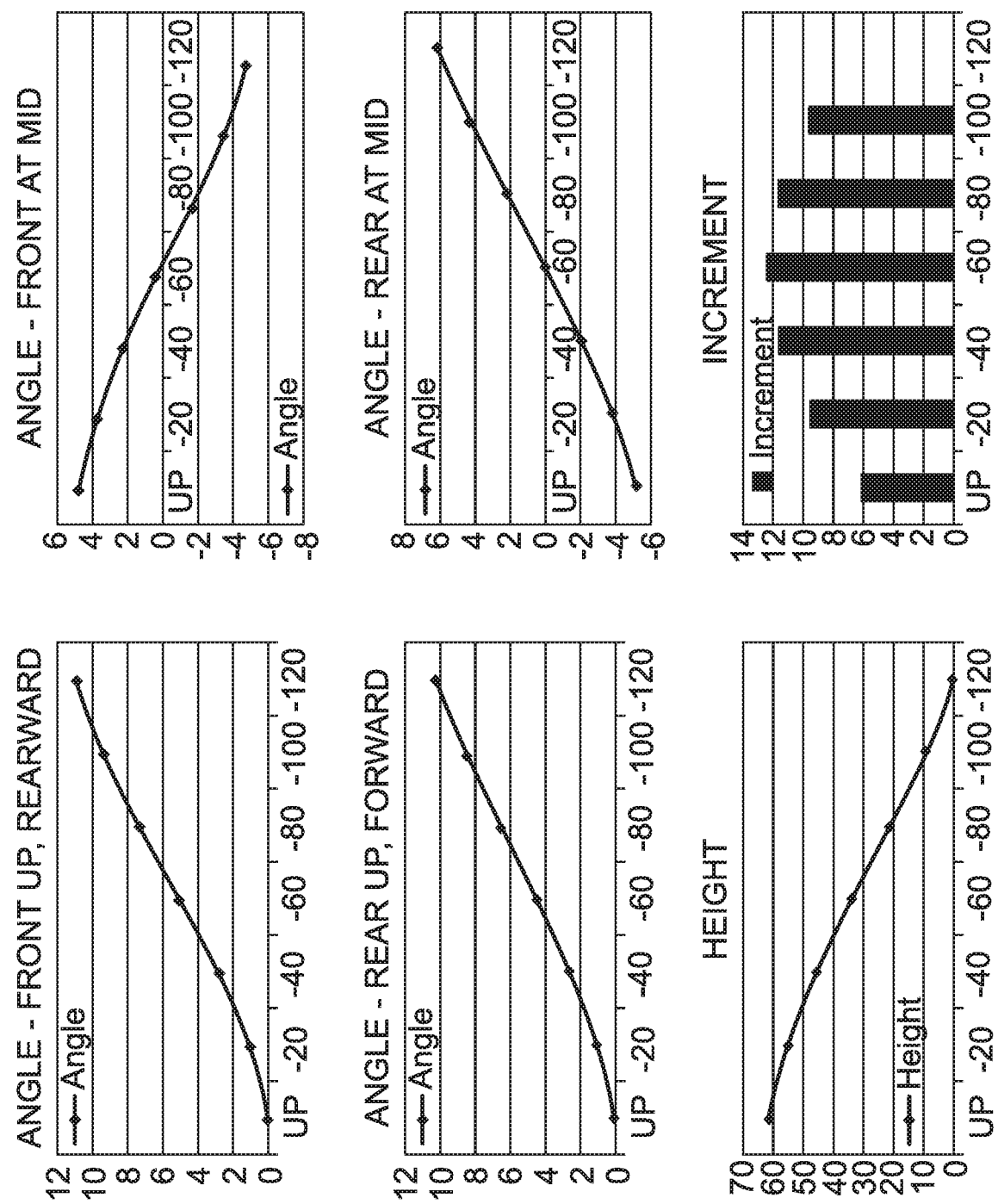

The chart of FIG. 18A and the graphs of FIG. 18B illustrate the ability of the adjustment assembly of the present disclosure to achieve a wide variety of seat orientations by selective operation of the front and rear actuation levers 82f, 82r. In one specific embodiment, the front and rear mechanisms can be adjusted at 20° increments from level (or "UP" in the figure) to −120°. These increments allow for more than the 34 seat orientations identified in the chart of FIG. 18A.

In the illustrated embodiment, the adjustment assembly 55 includes an upper plate 65 that is adapted to have the seat pan 52 or other seat structure mounted thereto. The assembly also includes a base plate 58 that is adapted to be mounted to the base 53 of the seat assembly. It is understood that the adjustment assembly can be altered so that the upper plate 65 is mounted to the base and the base plate 58 is adapted to have the seat pan mounted thereto. With this modification, the levers 82f, 82r would be re-oriented to allow easy access and operation to actuate the corresponding L-plate 77f, 77r.

Figure 19:
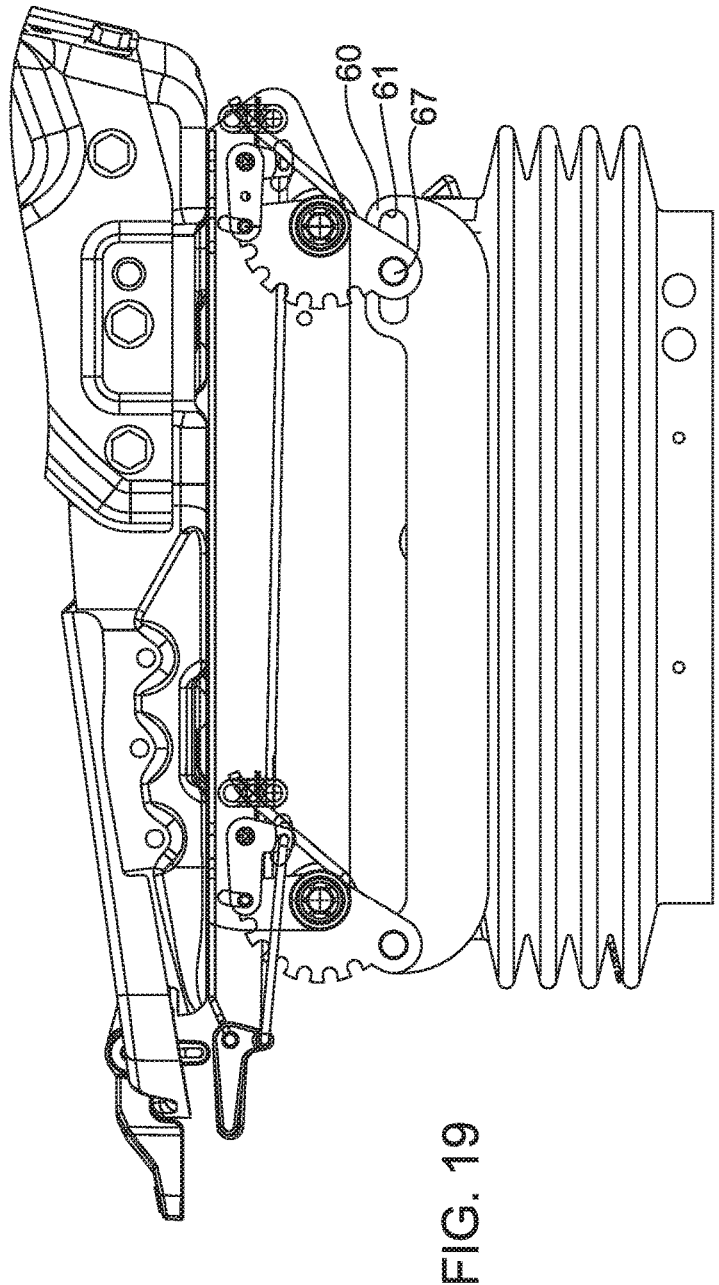
FIG. 19 is a side view of the adjustment assembly shown in FIG. 13.
Figure 20:
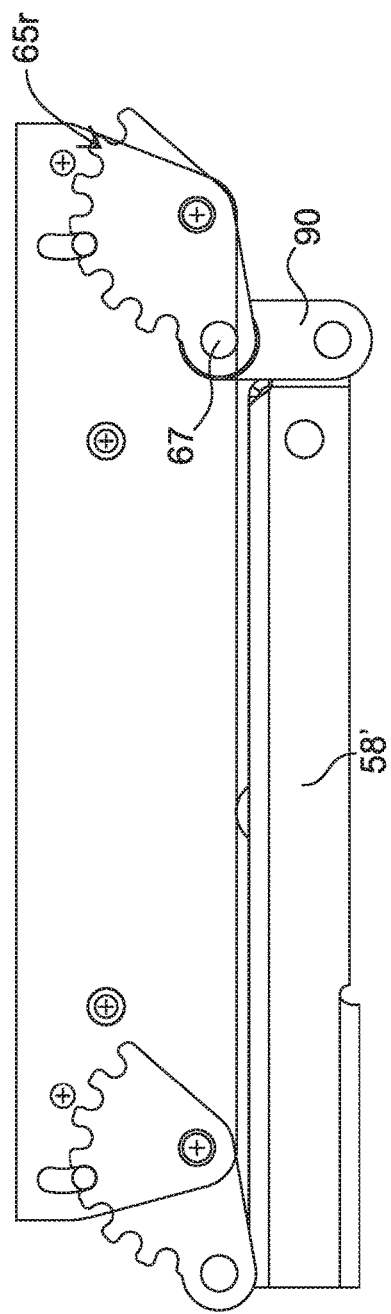
FIG. 20 is a side view of a modified seat adjustment assembly according to a further embodiment of the present disclosure.

As illustrated in FIG. 19, the adjustment assembly 55 just described utilizes a slot 61 to permit translation and rotation of the rear pivot rod 67. In an alternative embodiment shown in FIG. 20, the rear pivot rod 67 can be attached to a pivot link 90 that is pivotably mounted to a base plate 58'. The effect of this pivot link is the same as the slot 61 in that it constrains the movement of the rear latch gear 65r under operation of the torsion spring 73.

In another alternative embodiment, the adjustment mechanism can be limited to height adjustment only. In this embodiment, the front and rear L-plates 77f, 77r can be linked with a linking rod 92 so that the two adjustment mechanisms move in unison. It can be appreciated that with this modification the driver could still apply more force to one end of the seat to produce a tilted orientation. However, in this alternative, the rear pivot rod 67 extends through a fixed opening 61' in a modified rear tab 60' of the base plate. This modification prevents the rear pivot rod from sliding front and back, as would be necessary to accommodate an angle of tilt.

The present disclosure should be considered as illustrative and not restrictive in character. It is understood that only certain embodiments have been presented and that all changes, modifications and further applications that come within the spirit of the disclosure are desired to be protected.

What is claimed is:

1. An assembly for adjustment of the height and angle of tilt of a seat assembly, the seat assembly having a seat base and an upper seat portion, comprising:
   a frame having a portion configured to be connected to one of the seat base and upper seat portion;
   a base plate configured to be connected to the other of the seat base and the upper seat portion;
   said frame and said base plate each including a front end adjacent a front end of the seat assembly and a rear end adjacent a rear end of the seat assembly; and
   an adjustment assembly engaged between said frame and said base plate to move the frame and base plate relative to each other, said adjustment assembly including:
   at least one front latch gear rotatably supported by said frame at an axis of rotation adjacent said front end thereof, said front latch gear including a plurality of cogs, each cog corresponding to a predetermined distance between the front ends of said frame and said base plate;
   at least one rear latch gear rotatably supported by said frame at an axis of rotation adjacent said rear end thereof, said rear latch gear including a plurality of cogs, each cog corresponding to a predetermined distance between the rear ends of said frame and said base plate;
a front biasing spring associated with each of said at least one front latch gear and arranged to engage the front latch gear and said frame to bias said at least one front latch gear to a maximum rotation position in which the respective front ends of said frame and said base plate are at a maximum distance apart;
a rear biasing spring associated with each of said at least one rear latch gear and arranged to engage the rear latch gear and said frame to bias said at least one rear latch gear to a maximum rotation position in which the respective rear ends of said frame and said base plate are at a maximum distance apart;
a front spindle movably supported on said frame and arranged to engage a selected one of the plurality cogs of said front latch gear to hold the latch gear at a predetermined angular position relative to said frame corresponding to a predetermined distance between the front ends of said frame and said base plate;
a rear spindle movably supported on said frame and arranged to engage a selected one of the plurality cogs of said rear latch gear to hold the latch gear at a predetermined angular position relative to said frame corresponding to a predetermined distance between the rear ends of said frame and said base plate;
a front actuation lever supported by said frame at the front end thereof and positioned for manual access at the front of the seat assembly, said front actuation lever coupled to said front spindle to move said front spindle into and out of engagement with said selected one of the plurality of cogs of said front latch gear; and
a rear actuation lever supported by said frame at the front end of said frame and positioned for manual access at the front of the seat assembly, said rear actuation lever coupled to said rear spindle to move said rear spindle into and out of engagement with said selected one of the plurality of cogs of said rear latch gear,
whereby when said front spindle is disengaged from a cog of said front latch gear the front end of said frame can be moved substantially vertically relative to said base plate and when said front spindle is engaged to a cog of said front latch gear the front end of said frame is held in position relative to said base plate,
whereby when said rear spindle is disengaged from a cog of said rear latch gear the rear end of said frame can be moved substantially vertically relative to said base plate and when said rear spindle is engaged to a cog of said rear latch gear the rear end of said frame is held in position relative to said base plate, and
whereby said front and rear spindles are operable independent of each other to permit independent vertical movement of said front and rear ends of said frame relative to said base plate.

2. The assembly of claim 1, wherein said front and rear biasing springs are torsion springs engaged between said frame and a respective one of said front and rear latch gears.

3. The assembly of claim 1, wherein said at least one rear latch gear includes an arm extending radially relative to the axis of rotation of said rear latch gear, said arm connected to said base plate so that rotation of said rear latch gear rotates said arm to change the distance between said base plate and said frame at the rear end thereof.

4. The assembly of claim 3, wherein:
said arm of said at least one rear latch gear is engaged to a rear pivot axle; and
said rear pivot axle is retained within an elongated slot on said base plate,
wherein said elongated slot extends linearly in a direction between the back and front ends of said base plate to permit limited linear movement of said pivot axle between the back and front ends of said frame as said at least one rear latch gear rotates about said pivot axis.

5. The assembly of claim 3, wherein:
said arm of said at least one rear latch gear is engaged to one end of a rear pivot link; and
an opposite end of said rear pivot link is pivotably mounted to said base plate.

6. The assembly of claim 1, wherein said front latch gear includes an arm extending radially relative to the axis of rotation of said front latch gear, said arm connected to said base plate so that rotation of said rear latch gear rotates said arm to change the distance between said base plate and said frame at the front end thereof.

7. The assembly of claim 6, wherein said arm of said at least one front rear latch gear is engaged to a front pivot axle and said front pivot axle is rotatably connected to said base plate.

8. The assembly of claim 1, wherein said front spindle and said rear spindle are carried by respective front and rear lever elements, the lever elements pivotably mounted to said frame and are operable to pivot the respective front and rear spindle into and out of engagement with a selected one of the plurality of cogs, and the lever elements coupled to a respective front and rear actuation lever.

9. The assembly of claim 8, wherein:
said front and rear lever elements each include an L-shaped plate having an upper arm and a lower arm;
said spindle is connected to an end of the upper arm and joined to said lower arm at another end;
the respective front and rear actuation lever is coupled to said lower arm; and
said L-shaped plate is pivotably supported by said frame at said another end of said upper arm.

10. The assembly of claim 9, wherein:
two front and two rear latch gears are provided on opposite sides of said frame;
said L-shaped plate of a corresponding front and rear lever element is mounted to a pivot bar that is rotatably supported by said frame;
said front spindle engages said cogs of one of said two front latch gears on one side of said frame; and
said rear spindle engages said cogs of one of said two rear latch gears on an opposite side of said frame.

11. The assembly of claim 10, wherein
a second front spindle is provided for engaging said cogs of the other of said two front latch gears;
a second rear spindle is provided for engaging said cogs of the other of said two rear latch gears;
each of said second front and rear spindles is connected to an end of a separate upper arm and another end of said separate upper arm is pivotably supported by said frame;
said separate upper arm and said L-shaped plate of said two front latch gears are connected to a common front pivot bar that is rotatably supported by said frame; and
said separate upper arm and said L-shaped plate of said two rear latch gears are connected to a common rear pivot bar that is rotatably supported by said frame.

12. The assembly of claim 1, wherein said at least one front latch gear includes seven cogs spaced at 20 degree angular intervals around said latch gear.

13. The assembly of claim 1, wherein said at least one rear latch gear includes seven cogs spaced at 20 degree angular intervals around said latch gear.

14. The assembly of claim 1, wherein said frame and said base plate is sized and shaped so that said base plate nests within said frame when said frame and said base plate are at a minimum distance apart.

\* \* \* \* \*